US005257064A

United States Patent [19]

Okamoto

[11] Patent Number: 5,257,064

[45] Date of Patent: Oct. 26, 1993

[54] COPYING MACHINE PROVIDED WITH A RECIRCULATING DOCUMENT FEEDER APPARATUS

[75] Inventor: Yuji Okamoto, Nara, Japan

[73] Assignee: Sharp Kabushiki Kaisha, Osaka, Japan

[21] Appl. No.: 935,453

[22] Filed: Aug. 25, 1992

Related U.S. Application Data

[63] Continuation of Ser. No. 685,934, Apr. 16, 1991.

[30] Foreign Application Priority Data

Apr. 17, 1990 [JP] Japan ................................ 2-102638
Mar. 22, 1991 [JP] Japan ................................ 3-058750

[51] Int. Cl.[5] ...................... G03B 27/32; G03B 27/52; G03G 21/00

[52] U.S. Cl. ...................................... 355/24; 355/26; 355/318; 355/319; 355/320

[58] Field of Search .................... 355/23, 24, 26, 318, 355/319, 320

[56] References Cited

U.S. PATENT DOCUMENTS 4,330,197 5/1982 Smith et al. .
4,451,138 5/1984 Anderson .
4,466,733 8/1984 Pels .
4,536,078 8/1985 Ziehm .
4,553,828 11/1985 Burger et al. .
4,780,745 10/1988 Kodama ............................ 355/309

FOREIGN PATENT DOCUMENTS 0328722 8/1989 European Pat. Off. .
60-083930 5/1985 Japan .
61-032835 2/1986 Japan .

*Primary Examiner*—Monroe H. Hayes
*Attorney, Agent, or Firm*—David C. Conlin

[57] ABSTRACT

In a copying machine provided with a recirculating document feeding apparatus (RDH), the time required for the overall copying operation is reduced. In the copying machine provided with the RDH, there are cases where the copying operation is started after the number of the documents is counted. Maximum transporting speed of the document in the copying operation is a speed determined in accordance with minimum copying magnification. However, since the transporting speed of the document be set higher than the speed determined in accordance with the minimum copying magnification, the time required for the counting operation can be reduced. Thereby, the time required for the overall copying operation can be reduced.

3 Claims, 5 Drawing Sheets

COPYING MACHINE PROVIDED WITH A RECIRCULATING DOCUMENT FEEDER APPARATUS

This is a continuation of copending application Ser. No. 07/685,934 filed on Apr. 16, 1991.

BACKGROUND OF THE INVENTION

1. Field of the Invention

The present invention relates to a copying machine which comprises a recirculating document feeding apparatus for sequentially and circulatorily feeding and transporting a sheet document to a reading station where document images are to be read and effects copying operation in various copying modes in cooperation with the document feeding apparatus.

2. Description of the Prior Art

In recent years, copying machines have been provided with document feeding apparatus for feeding a plurality of documents sequentially to a reading station below which exposure means for reading document images is disposed in order to copy effectively a plurality of document sheets of same size. Particularly, such a document feeding apparatus is referred to as a recirculating document feeding apparatus, in which the documents placed in a document placing member are fed therefrom, transported to the reading station, and then returned to the placing member again. In this way, the documents are fed circulatorily in the recirculating document feeding apparatus.

With such a recirculating document feeding apparatus as described above, both sides of the document are fed to the reading stations with faced to corresponding reading stations. The document image read at the reading station is copied onto recording paper in the copying machine cooperating with the feeding apparatus. Thereby, various copying modes can be effected, such as a mode in which the documents having images on both sides thereof (hereinafter referred to as a duplex document) are copied correspondingly onto one or both sides of the recording paper (hereinafter referred to as a duplex copy) or another mode in which the documents having an image on one side thereof (hereinafter referred to as a simplex document) are copied onto both sides of the recording paper.

For example, in case of obtaining the duplex copy from the simplex document, the recirculating document feeding apparatus feeds a plurality of documents one by one to the reading station. In the copying machine, the document image exposingly read from one side of the document is formed into a latent image onto, for example, a photoreceptor rotating at a constant speed, and further developed into a toner image, which is copied onto one side of the fed recording paper. The recording paper to one side of which the copying operation has been effected is temporarily stored in an intermediate tray, then fed to the photoreceptor again. Thereupon, the document image read from the document fed to the reading station succeedingly to the document whose image has been copied onto one side of the recording paper is copied onto the other side of the recording paper. Consequently, the recording paper is discharged. In this way, duplex copies can be obtained from a plurality of simplex documents.

In the case where the duplex copies are obtained from the simplex documents, there are two copying processes. One is to copy the precollated simplex documents with respect to page number thereof from the last paged document. The other is to copy the similar documents from the first paged document. In the former case, the copying operation requires to be changed depending on whether the number of the documents is odd or even. More specifically, in the case where the number of the documents is even, a completely collated duplex copy set can be obtained just by copying the document images of the simplex documents sequentially onto both sides of the recording paper. However, in the case where the document images of the simplex documents are sequentially copied onto the recording papers in a similar manner as in the case where the document number is even, the other side of the recording paper, to one side of which the document image of the first page is copied, is blank and thereby a collated duplex copy set cannot be obtained.

Accordingly, the copy operator counts the number of the documents beforehand, and causes to switch to an appropriate copying process by inputting the information indicative of whether the number of the documents is odd or even through the use of a control panel. Alternatively, a plurality of documents placed in the placing member are circulated through the transporting path past the reading station without being copied, and thereby effecting the counting operation for automatically counting the number of the documents by means of sensors or the like.

Imposing the counting operation on the copy operator makes the copying operation cumbersome. Particularly, in the case where a large number of documents are to be copied, the copying operation becomes further burdensome and is liable to miscount the number of the documents.

On the other hand, the counting operation by transporting the documents without being copied in the recirculating document feeding apparatus does not involve a cumbersome operation, hence having been utilized in recent years. Besides a (simplex→duplex) mode, the counting operation can be effected in the cases which requires counting of the number of the documents beforehand, such as a blank paper inserting mode. In the blank paper inserting mode, a blank recording papers is inserted every plural number of copied recording papers.

The copying modes of the copying machine generally includes a standard mode in which the document image of the document is copied onto the recording paper in same size, a reduction mode in which the document image is copied onto the recording paper with reduced the size thereof, and a enlargement mode in which the document image is copied onto the recording paper with enlarged the size thereof. In the reduction and enlargement modes, transporting speed of the document past the reading station relative to the photoreceptor rotating at a constant speed is appropriately adjusted. Thereby, the size of the document image read onto the photoreceptor is controlled. In this way, magnification at which the document image is copied onto the recording paper is set in the respective copying mode.

The transporting speed of the documents sequentially transported without being copied in the counting operation has been set at a constant transporting speed at which the documents are transported to the reading station to be copied. More specifically, despite the fact that the transporting speed at which the document is transported to the reading station can be variable in accordance with the respective copying magnification, the constant transporting speed of the document in the counting operation is set equal to the transporting speed to the reading station in the standard mode. Accordingly, since the documents are transported without being copied at the constant transporting speed in accordance with the standard mode despite the capability of transporting the document more rapidly, a large amount of time should be uselessly spent on the counting operation. This results in spending much time to obtain the copied recording paper through the copying operation succeeding thereto.

SUMMARY OF THE INVENTION

It is an object of the invention to provide a copying machine provided with a recirculating document feeding apparatus capable of considerably reducing the time required for counting operation prior to copying operation.

The present invention provides the copying machine provided with the recirculating document feeding apparatus in which the document sheets placed in a placing member are sequentially fed to the reading station, at which the document images to be copied are read, at transporting speed determined in accordance with set copying magnification and returned to the placing member again after having the document images thereof read, and copies the read document image onto a recording paper wherein comprises controlling means for determining transporting speed of the document to be higher than the transporting speed determined in accordance with the minimum copying magnification when the documents are transported without being copied for the counting operation.

According to the invention, the copying machine is provided with the recirculating document feeding apparatus for sequentially feeding the document sheets placed in the placing member to the reading station and thereof returning the documents read the document images at the reading station to the placing member, i.e. feeding the documents circulatorily. In the recirculating document feeding apparatus, transporting speed of the documents fed to the reading station is set in accordance with set copying magnification. The document images read at the reading station are copied onto recording papers sequentially fed in the main body of the copying machine.

In the case where the counting operation of the documents is required prior to the copying operation, such as in a (simplex→duplex) mode and a blank paper inserting mode, the documents placed in the placing means are circulated through transporting path without the document images being read at the reading station. The transporting speed of the documents in the counting operation is set by the controlling means so as to be higher than the transporting speed at which the documents are transported to the reading station in accordance with the minimum copying magnification in the reduction mode.

Further, when the documents are transported without being copied, control of the transporting speed can be rough compared to control of the transporting speed when the documents are to be copied, thereby enabling high speed transportation of the documents while eliminating the need for a new circuit for controlling the transporting speed.

Accordingly, the transporting speed of the documents to be transported without being copied in the counting operation can be set at maximal transporting speed, thereby enabling the time required for the counting operation to be remarkably reduced.

As described above, according to the invention, in the copying machine provided with the recirculating document feeding apparatus capable of changing the transporting speed of the documents to be transported to the reading station in accordance with the copying magnification, the transportation of the documents is effected at the maximal transporting speed higher than the transporting speed in accordance with the minimal copying magnification in the counting operation of the documents. Thereby, the time required for the counting operation can be remarkably reduced. As a result, the counting operation is rapidly switched to the copying operation, reducing the time required for the entire copying operation and thereby operability of the copying machine will be improved.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
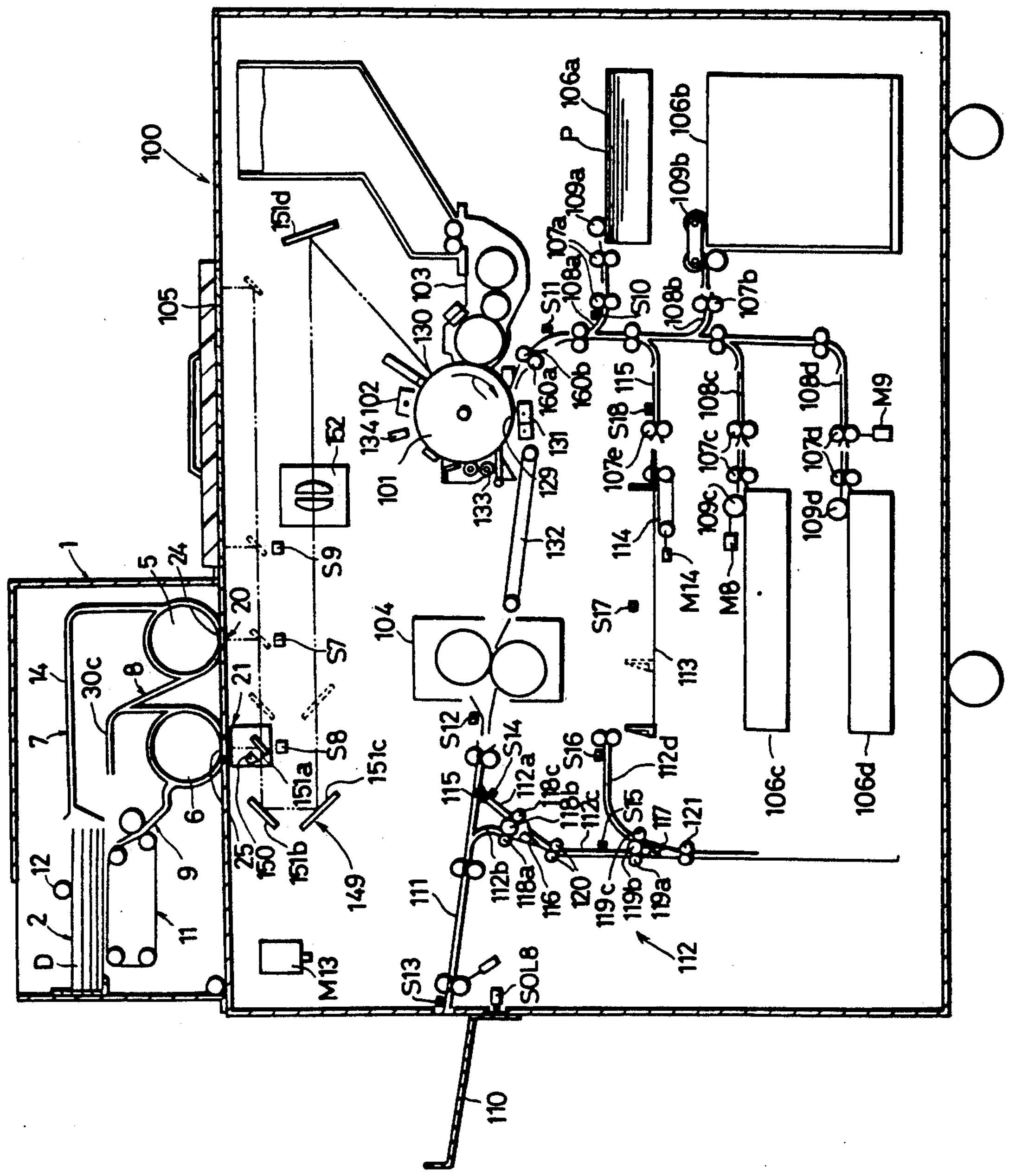
FIG. 1 is a schematic cross-sectional view showing a basic configuration of a transfer-type electrostatic copying machine provided with a recirculating document feeding apparatus 1.

Now referring to the drawing, preferred embodiments of the invention are described below.

FIG. 1 is a schematic cross-sectional view showing a transfer-type electrostatic copying machine provided with a recirculating document feeding apparatus 1. In the center of interior construction of a main body 100 of the copying machine is disposed a right cylindrical photoreceptor 101 rotatable at a specific rate. In the periphery of the photoreceptor 101 are respective copying processing portions together with a corona discharger 102 for charging and a developing device 103. On the left side of FIG. 1 with respect to the photoreceptor 101 is disposed a fixing device 104.

The recirculating document feeding apparatus 1 is arranged on top surface of the main body 100 of the copying machine. A first reading station 20 and a second reading station 21 disposed respectively right below a first support cylinder 5 and a second support cylinder 6 of the document feeding apparatus 1 are aligned in parallel substantially in the same plane on the top surface of the main body 100 of the copying machine. Further, on the top surface of the main body 100 of the copying machine is disposed a third reading station 105 for a bound book or the like constituting exposure means 149 capable of performing a dual system reading exposure method.

Figure 2:
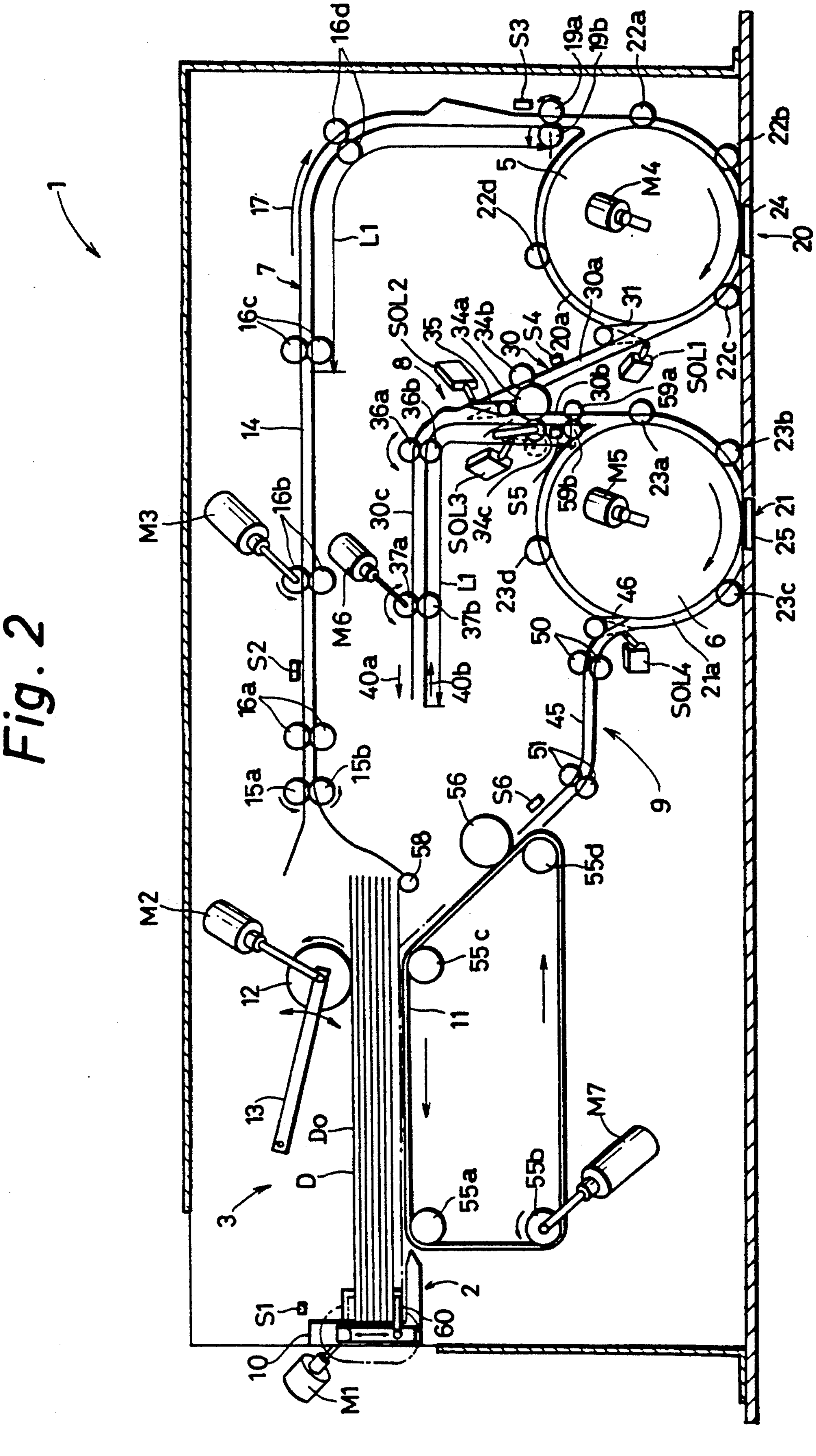
FIG. 2 is a schematic cross-sectional view showing a basic configuration of the recirculating document feeding apparatus 1.

FIG. 2 is a schematic cross-sectional view of the recirculating document feeding apparatus 1. The recirculating document feeding apparatus 1 comprises a document placing member 2 used as means for placing the documents, a feed means 3 for feeding the sheets of the documents one by one from the document placing member 2, the first support cylinder 5 in the form of right cylinder for transporting the document along the outer surface thereof and having one side of the document faced to the first reading station 20, the second support cylinder 6 in the form of right cylinder for having the other side of the document being transported faced to the second reading station 21, document transporting means 7 for transporting the document from the document placing member 2 to the first support cylinder 5, a document inverting means 8 provided between the first support cylinder 5 and the second support cylinder 6 for inverting transporting state of the document so that the document, one side of which is faced to the first reading station 20, has the other side thereof faced to the second reading station 21, and document returning means 9 for returning the document from the second support cylinder 6 to the document placing member 2.

In the document placing member 2, a plurality of document sheets precollated with respect to page number thereof are placed with one edge portions (left edge portion side in FIG. 1) thereof aligned by a document aligning member 10. For example, the documents are placed on a document transporting belt 11 with document side having the smallest page number placed face-down.

Above the document placing member 2 is disposed a feed roller 12 constituting the feed means 3 for feeding sequentially the documents D from the uppermost document out of the document placing member 2. The feed roller 12 is drivingly rotated at a predetermined timing by a document feed motor M2 in the direction of an arrow, and pressed against the document D0 stacked uppermost through a lever 13 by energization of a solenoid or the like when being rotated, thereby feeding the document D0 from the documents D to the document transporting means 7.

The document transporting means 7, to which the documents D is fed one by one from the document placing member 2 by the feed roller 12, comprises a transporting path 14 curved from the horizontal direction down to the vertical direction as shown in FIG. 2. At an end portion of an inlet of the transporting path 14 are disposed a pair of separating rollers 15*a* and 15*b* for preventing multiple feeding of the documents. The separating roller 15*a* disposed above is drivingly rotated in the direction of transport of the document, and the separating roller 15*b* disposed below is drivingly rotated in the opposite direction of transport of the document. The documents D are reliably separately fed to the transporting path 14 one by one by passing the nip between the separating roller 15*a* and 15*b*. Along the transporting path 14 are arranged pairs of rollers 16*a*, 16*b*, 16*c*, and 16*d* with spaced with one another.

These pairs of transporting rollers 16*a* to 16*d* rotatably come into contact with both sides of the document D respectively. The pairs of transporting rollers 16*a* to 16*d* are forcefully rotated by the document feed motor M3 to guidingly feed the document D in the direction of an arrow 17. Alongside of the inlet of the transporting path 14 is disposed a document feed sensor S2, and alongside of the outlet of the transporting path 14 is disposed a sensor S3 before the first reading station in the direction of transport of the document.

Also, at the outlet portion of the transporting path 14 (in the periphery of the first support cylinder 5) is disposed a pair of first resist rollers 19*a* and 19*b*. The first resist rollers 19*a* and 19*b* are coupled to a drive shaft through a clutch CLT1, not shown, and stopped rotating and rotated again by ON-OFF control of the clutch CLT1. The ON-OFF control of the clutch CLT1 is controlled in accordance with the operator's desired copying mode.

That is to say, in the case where it is required for the document to be read, the resist rollers 19*a* and 19*b* are stopped rotating to have the document D waited therebetween so as to synchronize with transport of recording paper in the main body 100 of the copying machine. After synchronization with the transport of recording paper, the resist roller 19*a* and 19*b* are rotated again to transport the document D to the first support cylinder 5. On the other hand, in the case where it is not required for the document to be read, the resist rollers 19*a* and 19*b* are normally rotated merely as rollers for transporting the documents similar to the other transporting rollers to pass the document D without stopping it therebetween.

In addition, in the case where the first resist rollers 19*a* and 19*b* are operated merely as transporting rollers, the transporting rollers 16*c* and 16*d*, which are disposed upstream of the direction of transport of the document with respect to the resist rollers 19*a* and 19*b* by the length of not longer than allowable maximum length L1 of the document D being transported, are not stopped rotating until the transport of the document D is completed. On the other hand, in the case where the first resist rollers 19*a* and 19*b* are operated as resist rollers for adjusting the timing for the document D to be fed to the first support cylinder 5 by having the document D waited therebetween, rotation of the transporting rollers 16*c* and 16*d* is controlled as well.

That is to say, when a leading edge of the document D transported along the transporting path 14 is fed to the nip between the first resist rollers 19*a* and 19*b*, the transporting rollers 16*c* and 16*d* is stopped temporarily rotating to stop the transport of the document D. Thereafter, at the same time when the first resist rollers 19*a* and 19*b* are started rotating, the transporting rollers 16*c* and 16*d* are also started rotated again, resuming the transport of the document D.

Reading stations for reading an image of the document D includes the first reading station 20 and the second reading station 21 corresponding to respective bottom end surfaces of the first support cylinder 5 and the second support cylinder 6 arranged in parallel with spaced to each other in the horizontal direction. The first reading station 20 and the second reading station 21 are positioned in the same flat surface as shown in the figure.

The support cylinders 5, 6 are drivingly rotated respectively by document transporting motors M4, M5 in the clockwise direction (see FIG. 2) synchronized with transporting speed at which the document is to be fed to each of reading stations 20 and 21 in accordance with a copying speed at which the document image is copied onto the recording paper, or a set copying magnification. Also, the support cylinders 5, 6 have driven rollers 22*a* to 22*d*, 23*a* to 23*d* respectively provided along the outer surface thereof with spaced at specific intervals. The document D is rolled pressingly against the outer surfaces of the support cylinders 5 and 6 by these driven rollers, and fed along the circumferential transporting paths 20*a* and 20*b* defined on the outer side of the support cylinders 5 and 6.

Right below the circumferential transporting paths 20a and 20b are respectively placed hard transparent glass plates 24 and 25 constituting respectively the first and the second reading stations 20 and 21. When the document D is passed between the first support cylinder 5 and the first transparent glass plate 24 at the speed in accordance with the set copying magnification, one side of the document (upside of the document D stacked in the document placing member 2 in FIG. 2) is read and exposed, thereby performing the reading of the image corresponding to one side of the document. When the document D is passed between the second support cylinder 6 and the second transparent glass plate 25, the other side of the document D (downside of the document D in the document placing member 2) is read and exposed, thereby performing the reading of the image corresponding to the other side of the document to be described hereinafter.

Moreover, in the transport of the document accompanied by the operator's desired copying mode and counting operation of the documents to be described below, there are cases where the documents D are passed through the first reading station 20 and the second reading station 21 without any reading or exposure operation.

To the first reading station 20 is fed the document D being rolled to the first support cylinder 5 by rotational force caused by the first resist 19a and 19b through the transporting path 14 provided in the document transporting means 7. Between the first support cylinder 5 and the second support cylinder 6 is disposed a document inverting means 8 provided with an inverting path 30 for inverting sides of the document to be faced to the reading station. The inverting path 30 has a first path 30a and a second path 30b extending upwardly with inclination from the portions of the circumferential transporting paths 20a and 21a opposing to each other, and a third path 30c extending in the horizontal direction from the junction of the first and the second paths 30a and 30b.

A direction switching claw 31 is provided at the inlet portion of the first path 30a continuously connected to the circumferential transporting path 20a of the first support cylinder 5. The direction switching claw 31 is actuated by a solenoid SOL1 to selectively transport the document D to either of the first path 30a or the circumferential transporting path 20a of the first support cylinder. More specifically, the document D passed through the first reading station 20 is transported to the first path 30a by actuating the direction switching claw 31 to move to a position shown by a solid line in FIG. 1 in the case where it is sufficient for the document D to be read and exposed only once in accordance with the operator's desired copying mode. On the other hand, in the case where the document D should be read and exposed more than once, the direction switching claw 31 is actuated to move to a position shown by a two-dot line to transport the document D along the circumferential path 20a of the first support cylinder 5 more than once.

After the document D is read and exposed, the direction switching claw 31 is actuated to move to the solid lined position to transport the document D to the first path 30a. Along the first path 30a are disposed a sensor S4 positioned after the first reading station for detecting a trailing edge of the document D, a pair of rollers 34a and 34b, and a direction switching claw 35 in the order thereof from the upstream of the transporting direction of the document D. In accordance with a sensor signal from the sensor S4 is controlled inversion operation for inverting both sides of the document D to be described hereinafter.

The document D is transported to the third path 30c through the direction switching claw 35 by the drivingly rotated rollers 34a and 34b. Two pairs of rollers 36a, 36b and 37a, 37b are disposed along the third path 30c with holding the third path 30c therebetween. The rollers 36a and 37a are rotated in normal and reverse directions by a motor M6 for in-verting the document. After transporting the document D passed through the direction switching claw 35 in the direction of an arrow 40a in the third path 30c, the transporting rollers 36 and 37 transport the document D in the direction of an arrow 40b by invertingly rotating the motor M6 at the time when the trailing edge of the document D passed through the direction switching claw 35.

The direction switching claw 35 is actuated to move to a solid lined position shown in FIG. 1 by a solenoid SOL2 disconnecting the first path 30a to the third path 30c while connecting the second path 30b thereto, thereby rendering the document D transported to the second path 30b. The second path 30b has the roller 34c provided therealong, and is in pressing contact with the roller 34a by a solenoid SOL3 and thereby transports the document D with holding it therebetween. Although the rotatable in normal and reverse directions rollers 36 and 37 are adapted to embody the inverting operation for inverting both sides of the document as hereinbelow described, a belt transporting device and an air transporting device, for example, may also be adapted for the same purpose.

Moreover, rotational forces of the rollers 34a and 34c are adapted to assist the second support cylinder 6 in transporting the document D to the second reading station 21 with having the document D rolled to the outer surface thereof. In the downstream position in the transporting direction with respect to the roller 34c is disposed a sensor S5 positioned before the second reading station for detecting passage of the trailing edge of the document D.

Further, on the downstream side in the transporting direction with respect to the sensor S5 are arranged a pair of second resist rollers 59a and 59b coupled to the drive shaft through a clutch CLT2, although unillustrated. The second resist rollers are .stopped rotating and started rotating again by the ON-OFF control by the clutch CLT2. The ON-OFF control by the clutch CLT2 is controlled in accordance with the operator's desired copying mode.

More specifically, in the case where the document D is required to be read, the resist rollers 59a and 59b are stopped rotating to have the document D wait so as to synchronize with the recording paper. After the document D is synchronized with the recording paper, the rollers 59a and 59b are started rotating again so as to transport the document D to the second support cylinder 6. On the other hand, in the case where the document D is not required to be read, the rollers 59a and 59b are rotated as transporting rollers at all times to pass the document D therebetween without having the document D wait. Here, operation by the solenoid SOL3 is controlled in accordance with rotation of the rollers 59a and 59b.

In addition, transporting rollers 36 and 37 are arranged on the downstream side in the transporting direction with respect to the second resist rollers 59a and 59b by the length of not longer than an allowable maximum length L1 of the document D to be transported. The second resist rollers 59$a$ and 59$b$ are to the transporting rollers 36 and 37 what the first resist rollers 19$a$ and 19$b$ are to the transporting rollers 16$c$ and 16$d$ in operational relationship thereof.

More specifically, in the case where the second resist rollers 59$a$ and 59$b$ are operated merely for transporting documents, the transporting rollers 36 and 37 for transporting the document D to the second support cylinder 6 are kept rotating until the transport of the document D is completed. On the other hand, in the case where the second resist rollers 59$a$ and 59$b$ are operated as for resisting the documents, the transporting rollers 36 and 37 are temporarily stopped rotating when the leading edge of the document D reaches to the nip between the rollers 59$a$ and 59$b$. Thereafter, at the same time when the second resist rollers 59$a$ and 59$b$ are started rotating, the transporting rollers 36 and 37 are also started rotating, thereby resuming transport of the document D.

As described hereinbelow, one side of the document D which has already been faced to the first reading station 20 is faced and rolled to the outer surface of the second support cylinder 6 by transporting direction of the document D being reversed in the inverting path 30. Accordingly, the document D is transported to the second support cylinder 6 with the other side thereof, which has not yet faced to the reading station, faced down. In view of this, the other side of the document D transported at a transporting speed in accordance with the set copying magnification is exposed in the second reading station 21 and consequently an original image thereof is read.

The direction switching claw 46 is arranged in a location where the document passed through the second reading station 21 is branched off to a transporting path 45 of the document returning means 9 from the circumferential transporting path 21$a$ of the second support cylinder 6. The direction switching claw 46 is actuated by a solenoid SOL4 to selectively open or close the circumferential transporting path 21$a$ to the transporting path 45.

More specifically, in the case where the document D is exposed and read only once in the second reading station 21 depending on the operator's desired copying mode, the circumferential transporting path 21$a$ is open to the transporting path 45, to which the document D is thereby transported. On the contrary, in the case where the document D is exposed and read more than once, the transporting path 45 is closed. Accordingly, after transported in the circumferential transporting path 21$a$ the required number of times, the document D is transported to the transporting path 45.

As described hereinbelow, the document images on both sides of the document D can be read, by exposing and reading the document images on one side and the other side of the document D in the first reading station 20 and the second reading station 21 respectively. Also, since the document D is exposingly read in the first and the second reading station 20, 21 respectively the required number of times, a plurality of sets of copies can be made from a plurality of the documents D.

In the document returning means 9 for returning the document D from the second reading station 21 to the document placing member 2, the transporting path 45 is connected to the end portion of a transport belt 11 on the below side for transporting the document D thereto. More specifically, the transporting path 45 has pairs of transporting rollers 50 and 51 provided therefore for transporting the document D. Moreover, in the vicinity of the outlet of the transporting path 45 is disposed a sensor S6 positioned before the document placing member 2 for detecting passage of the document D. Operation of the transport belt 11 and the document returning means 9 is controlled in accordance with a sensor signal from the sensor S6.

The endless transport belt 11 is installed encirclingly on rollers 55$a$, 55$b$, 55$c$, and 55$d$ spaced laterally and longitudinally to one another as shown in the figure. The driving roller 55$b$ is drivingly rotated in the direction of an arrow by a motor M7 adapted to return the document D to the placing member 2 in accordance with the sensor signal from the sensor S6, thereby drivingly rotating the transport belt 11 in a counterclockwise direction (see FIG. 2.) The upper stretching portion of the transport belt 11 also serves as a placing member for the documents D. In addition, a document sucking roller 56 is disposed in a position adjacent to the transporting path 45 and feeds the document D to the nip between the upper stretching portion of the transport belt 11 and the bottommost stacked document D by transporting force with the transport belt 11.

In order to smooth this operation, a document kick-up roller 58 is provided below the end portion on the downstream side in the feeding direction of the documents D placed in the document placing member 2. The kick-up roller 58 lifts temporarily the right edge portion of the stacked documents D from the transport belt 11, expanding reliably an opening for feeding the document into the bottommost position. The document D fed into the bottommost position is completely returned to the document placing member 2 by the motor M7 for driving the transport belt 11 being stopped driving at the time when the leading end thereof reaches to the edge aligning member 10.

Moreover, as illustrated, the document placing member 2 is provided with an actuating member 60 comprising, for example, a specularly formed stainless plate for detecting one circulation of the document D placed therein. The actuating member 60 is in a position shown by a solid line in FIG. 1 before the operator places a stack of documents D in the document placing member 2, and then the documents D are placed thereon. As the documents D are fed one by one from the document placing member 2 and returned thereto again, the actuating member 60 gradually shifts upwardly. The actuating member 60 is interposed between the unfed documents and the restacked documents, separating the both from each other. When all the documents D are circulated, the actuating member 60 reaches the uppermost position shown by a two-dot line.

The actuating member 60 which has reached the uppermost position has an exposed state thereof detected by, for example, the sensor S1 included in the document placing member 2 detecting one circulation of the document, the sensor S1 being comprised of a combination of a light emitting element and a photoreceiving element. Upon detection of the exposed state of the actuating member 60, the sensor S1 generates a sensor signal indicative of completion of one circulation of the document. Such an operation as to make sets of copies by the operator's desired number on the main body 100 side of the copying machine is controlled in accordance with the sensor signal from the sensor S1. Thereafter, the actuating member 60 is drivingly rotated by 180 degrees by a motor M1 for driving the actuating member 60 and returned to the bottom-most position (original position) with the document D placed thereon.

Referring back to FIG. 1, in the upper portion of the interior of the main body 100 of the copying machine are disposed a light source 150 for slit exposing side of the document, reflectors 151*a*, 151*b*, 151*c*, and 151*d*, and the exposure means 149 including a zoom lens 152. In the exposure means 149, when the light from the light source 150 is incident upon the side of the document D, the reflected light representative of a document image forms an image in exposure region 130 of the photoreceptor 101 through the reflectors 151*a* to 151*d* and the lens 152.

The exposure means 149 performs reading and exposure in a pausing state in the first and the second reading stations 20, 21 right below the first and the second support cylinders 5, 6 respectively in accordance with transport of the document D at a transporting speed based on the copying magnification in the document feeding apparatus 1. Moreover, in the case where a book or the like is placed on the third reading station 105, a first moving body 71 comprising the light source 150 and the reflector 151*a* performs exposure and reading while scanning the third reading station 105. These two reading exposure methods are effected by driving the exposure means 149 by a motor M13.

As drivingly rotated in the clockwise direction at a constant speed, the photoreceptor 101 is electrostatically charged by the corona discharger 102. In the exposure region 130 of the charged photoreceptor 101, the reflected light through the exposure means 149 forms an electrostatic latent image corresponding to the read document image. Thus formed electrostatic latent image is developed into an toner image by the developing device 103. The toner image is transferred to a recording paper P in transfer region 129 by a corona discharger 131 for transfer, the recording paper P being fed to the photoreceptor 101 to be described hereinafter. After transferred to the recording paper P, the image is transported to a fixing device 104 by a transporting mechanism 132 and thereby fixed.

In addition, upon completion of image transfer in the transfer region 129, the residual toner on the photoreceptor 101 is removed by a cleaning device 133 provided downstream of the transfer region 129 in the rotating direction of the photoreceptor 101. Thereafter, the residual charge on the photoreceptor 101 is removed by a charge removing device 134, and the surface of the photoreceptor 101 is charged by the corona discharger 102 so as to be ready for formation of a succeeding image.

Paper cassettes 106*a* and 106*b* containing a stack of the recording paper P are loaded on one side of the main body 100 of the copying machine, and paper cassettes 106*c* and 106*d* are loaded in the bottom portion thereof. The stack of the recording paper P placed in the paper cassettes 106*a* to 106*d* are fed from the uppermost stacked recording paper one by one to feeding paths 108*a* to 108*d*. The recording paper P are fed as paper feed rollers 109*a* to 109*d* disposed on upper surface of each of paper cassettes 106*a* to 106*d* are drivingly rotated by motors M8. The feeding paths 108*a* to 108*d* and a feeding path 115 from an intermediate tray 113 has respectively transporting rollers 107*a* to 107*e*, which are drivingly rotated by a motor M9 to feed the recording paper P to the copying operation processing portion.

Transporting timing of the recording paper P fed from the paper cassettes 106*a* to 106*d* and the intermediate tray 113 is controlled by third resist rollers 160*a*, 160*b* disposed on the transporting path to the photoreceptor 101. More specifically, when a leading edge of the recording paper P transported to the photoreceptor 101 is fed to the nip between the third resist rollers 160*a* and 160*b*, transport of the recording paper P is temporarily stopped.

When one side of the document D is exposed and read in the first reading station 20, the first resist rollers 19*a*, 19*b* are employed for controlling the transport of the document D and the second resist rollers 59*a*, 59*b* are employed merely for transporting the document D, both the first and the second resist rollers being provided in the document feeding apparatus 1. After the document D and the recording paper P are temporarily stopped between the first resist rollers 19*a* and 19*b*, and between the third resist rollers 160*a* and 160*b* respectively, the first resist rollers 19*a*, 19*b* are drivingly rotated to restart transporting the document D and, after a preset period of time, the third resist rollers 160*a*, 160*b* are drivingly rotated to restart transporting the recording paper P.

The preset period of time is the time required for the second operation subtracted from that required for the first operation. Here, the first operation means that the document D transported again by the first resist rollers 19*a*, 19*b* after the temporary stop therebetween are exposed and read in the first reading station 20, and the downstream side edge of the toner image in the moving direction, corresponding to the original image, formed on the photoreceptor 101 reaches the transfer region 129. The second operation means that the leading edge of the recording paper P transported by the third resist rollers 160*a*, 160*b* after the temporary stop therebetween reaches the transfer region 129. The preset period of time is counted down by a timer provided in, for example, a controlling device. Accordingly, the transferred image and the recording paper P can be reliably registered by synchronizing with each other.

Further, when the other side of the document D is exposed and read in the second reading station 21, the first resist rollers 19*a*, 19*b* are employed merely for transporting the document D and the second rollers 59*a*, 59*b* are employed for resisting. Relationship between the timing of transport of the document D by the second resist rollers 59*a*, 59*b* and the timing of transport of the record paper P by the third resist rollers 160*a*, 160*b* are similar to the relationship in synchronizing the timings of the first resist rollers 19*a*, 19*b* and the third resist rollers 160*a*, 160*b*. In addition, such a rotation/-stop control of the third resist rollers 160*a*, 160*b* as described above is effected by a ON-OFF control of a clutch CLT3 provided between the third resist rollers 160*a*, 160*b* and driving motor therefor for transporting the recording paper.

On the other side of the main body 100 of the copying machine is provided a discharge tray 110, to which a solenoid SOL 8 is mounted. When the solenoid SOL 8 is magnetized for a predetermined period of time, the discharge tray 110 is shifted forwardly in the direction normal to the surface of FIG. 1. On the contrary, when the solenoid SOL 8 is demagnetized for a predetermined period of time, the discharge tray 110 is shifted rearwardly in the direction normal to the surface of FIG. 1. Thereby, plural sets of recording paper having plural document images copied thereon can be discharged to the discharge tray 110 in sorted state.

In the main body 100 of the copying machine are a discharging path 111 for discharging the recording paper P passed through the fixing device 104 by way of the copying operation processing portion and an inverting path 112 for inverting the recording paper P, the inverting path 112 being diverged from the discharging path 111. The recording paper P passed through the copying operation processing portion and the fixing device 104 and having one side thereof formed the image corresponding to the original image thereon is discharged to the discharge tray 110 in any one of the following three modes (i) to (iii) in accordance with the operator's desired copying mode.

(i) The recording paper P is directly transported through the discharging path 111 from the fixing device 104 to be discharged to the discharge tray 110.

(ii) After being transported to the discharging path 111 from the fixing device 104, the recording paper P is transported to the inverting path 112 so as to be switched back therein. Thereafter, the recording paper P is temporarily stacked in the intermediate tray 113 to be transported to the copying operation processing portion again. A pile of the recording paper P stacked in the intermediate tray 113 are fed from the bottommost stacked one by a feeding mechanism 114 drivingly rotated by a motor M14, and transported to the copying operation processing portion through the transporting path 115. Consequently, the recording paper P is discharged to the discharge tray 110 through the fixing device 104 and the discharging path 111.

(iii) The recording paper P is transported through the discharging path 111 from the fixing device 104 to the inverting path 112, where being inverted, and thereafter discharged to the discharge tray 110.

In order to enable these three transporting modes of the recording paper P, the inverting path 112 comprises paths 112*a* and 112*b* diverged from two locations in the discharging path 111, a path 112*c* into which the paths 112*a* and 112*b* are joined, and a path 112*d* diverged from the path 112*c* and directed toward the intermediate tray 113. A first direction switching claw 115 is disposed in the location from which the path 112*a* is diverged from the discharging path 111. A second direction switching claw 116 is disposed in a location where the paths 112*a* and 112*b* are joined. A third direction switching claw 117 is disposed in a location where the paths 112*d* are diverged from the path 112*c*. These first to third direction switching claws 115 to 117 are actuated respectively by unillustrated driving solenoids SOL5, SOL6, and SOL7, thereby selecting the transporting path for the recording paper P in accordance with the operator's desired copying mode.

In the vicinity of the joining location of the paths 112*a* and 112*b* are provided pairs of rollers 118*a*, 118*b*, and 118*c*. In the vicinity of the diverging location of the paths 112*c* and 112*d* are provided pairs of rollers 119*a*, 119*b*, and 119*c*. Each of these pairs of rollers are employed for transporting the recording paper P. Further, in the path 112*c* are disposed a pair of rollers 120 for inverting the recording paper P in the vicinity of the joining location of the paths 112*a* and 112*b*, the pair of rollers 120 being rotated in normal and reverse directions by an unillustrated motor M11 so as to reverse the transporting direction of the recording paper P. Below the diverging location of the paths 112*c* and 112*d* are disposed a pair of rollers 121 for inverting the recording paper P, which are rotated in normal and reverse directions by an unillustrated motor M12. Further, a sensor S13 for detecting discharge of the recording paper P is disposed in the vicinity of the outlet of the discharging path 111. Sensors S14, S15 for detecting inversion of the recording paper P are disposed in the vicinity of the diverging location of the discharging path 111 and the path 112*a* and in path 112*c* respectively. Furthermore, a sensor S16 for detecting an inlet of the intermediate tray 113 is disposed in the vicinity of the outlet of the path 112*d*.

With such a construction of the inverting path 112 as described above, in the case where the discharged mode (i) is selected, the direction switching claw 115 is actuated to close the path 112*a* to the discharging path 111 so that the recording paper P is discharged along the discharging path 111. In the case where the discharge mode (ii) is selected, the direction switching claw 115 is actuated to close the discharging path 111 so that the recording paper P is transported through the path 112*a*, and the direction switching claw 116 is actuated to open the path 112*c*, in which the recording paper P have the transporting direction thereof reversed by the inverting rollers 121. Thereafter, the direction switching claw 117 is actuated to close the path 112*c* so as to open the path 112*d* for the recording paper P, which is in turn introduced to the intermediate tray 113. In the case where the discharge mode (iii) is selected, after transported to the path 112*c* as described above, the recording paper P has the transporting direction thereof reversed by the inverting rollers 120. Thereafter, the direction switching claw 116 is actuated to close the path 112*a* so as to open the path 112*b* for the recording paper P, which is in turn introduced to the discharging path 111 through the path 112*b*.

In this copying machine are provided following sensors for detecting the transporting state of the recording paper P in each location shown in FIG. 1. A sensor S10 is adapted to detect that the recording paper P is fed from the paper cassette. A sensor S11 is adapted to detect that the recording paper P is in a position just before the transfer region 129. A sensor S12 is adapted to detect that the recording paper P has just had the transferred image fixed thereon. A sensor S17 is adapted to detect presence or absence of the paper in the intermediate tray 113. A sensor S18 is adapted to detect that the paper has been fed from the intermediate tray 113.

A copying machine provided with such a recirculating document feeding apparatus 1 as described above is capable of effecting the following copying operations by recirculating a plurality of document sheets D plural times in accordance with the operator's desired copying mode.

(A) The operation for obtaining a plurality of sorted sets of simplex copies from simplex documents (simplex→simplex mode.)

(B) The operation for obtaining a plurality of sorted sets of duplex copies from simplex documents (simplex→duplex mode.)

(C) The operation for obtaining a plurality of sorted sets of simplex copies from duplex documents (duplex→simplex mode.)

(D) The operation for obtaining a plurality of sorted sets of duplex copies from duplex documents (duplex→duplex mode.)

Alternatively, it is also possible that the document D is exposed and read plural times while being circulated around the support cylinder with rolled thereto so as to make a plurality of copies during one circulation of the document D in accordance with the operator's desired copying mode.

Further, the rotating speeds of the resist rollers 19*a*, 19*b* and 59*a*, 59*b* disposed before and after the support cylinders 5 and 6 in the transporting direction and the other transporting rollers are controlled in accordance with the set copying magnification. Thereby, a magnification for the document image read onto the photoreceptor 101 drivingly rotated at the constant speed is regulated so that the document image can be copied onto the recording paper in a desired size corresponding to a standard mode, reduction mode, and enlargement mode. More specifically, a speed at which the document D is transported to each of reading stations 20, 21 in the standard mode is made a reference speed. In the reduction mode, the support cylinders 5, 6 and the resist rollers or the like are controlled so as to increase rotating speeds thereof based on the reduction magnification and thereby the document D is transported to each of the reading station 20, 21 at a higher speed. On the contrary, in the enlargement mode, the support cylinders 5, 6 and the resist rollers or the like are controlled so as to decrease rotating speeds thereof based on the enlargement magnification and thereby the document D is transported to each of the reading station 20, 21 at a lower speed.

In the case where the copying mode (B) is selected and the documents D are copied from the bottommost placed one, the controlling operation differs depending on whether the number of the documents D is odd or even. Accordingly, before the copying operation is effected in the set copying mode, counting operation for the documents D is effected so as to determine whether the number of the documents D is odd or even. In this embodiment, the counting operation is effected automatically by the recirculating document feeding apparatus 1.

More specifically, the documents D to be copied stacked in the document placing member 2 are sequentially fed through the transporting path to the support cylinder 5, the document inverting means 8, and the support cylinder 6 while the resist rollers 19*a*, 19*b*, and 59*a*, 59*b* are employed merely for transporting the documents D. Consequently, the documents are returned to the placing member 2 by means of the transporting belt 11. In this way, all the documents D stacked in the placing member 2 are circulated through the transporting course. The documents D can be counted by any one of the optical sensors S2 to S6 disposed in the vicinity of the transporting course. The sensor S1 detects that all the documents D have circulated the transporting course thereof.

Since only the number of the documents D is counted in the counting operation, the documents D transported to the reading stations 20, 21 by way of the support cylinders 5, 6 are not to be exposed and read by the exposure means 149. That is to say, the documents D are merely to be transported without the copying operation. In such a mere transportation of the documents D, a fastest possible operation is desired irrespective of set copying magnification.

In this embodiment, the maximum transporting speed of the document D in the transporting course thereof is higher than the speed at which the copying operation at the minimum copying magnification is effected in the reduction mode. Accordingly, the support cylinders 5, 6 and the resist rollers or the like are controllably rotated based on the maximum transporting speed in the counting operation.

The documents D are transported without being copied in the counting operation at a high speed, hence the time required to effect the counting operation can be remarkably reduced. As a result, the time required to obtain the duplex copies from the simplex documents D (simplex→duplex mode) after being placed in the placing member 2 can be remarkably reduced.

Further, such a counting operation as described above can be preferably embodied to count the number of the documents beforehand in a mode wherein a sheet of blank recording paper is inserted to between two desired sheets of a plurality of copied ones, or a blank paper inserting mode, other than a (simplex→duplex) mode. More specifically, in the blank paper inserting mode, the necessary information, for example, the information indicative of between the n page and n+1 page, is inputted through the use of a keyed control panel and thereby the blank sheet of recording paper is discharged without being copied in the copying operation processing portion every desired number of the recording paper to be lied between the copied papers.

Figure 3:
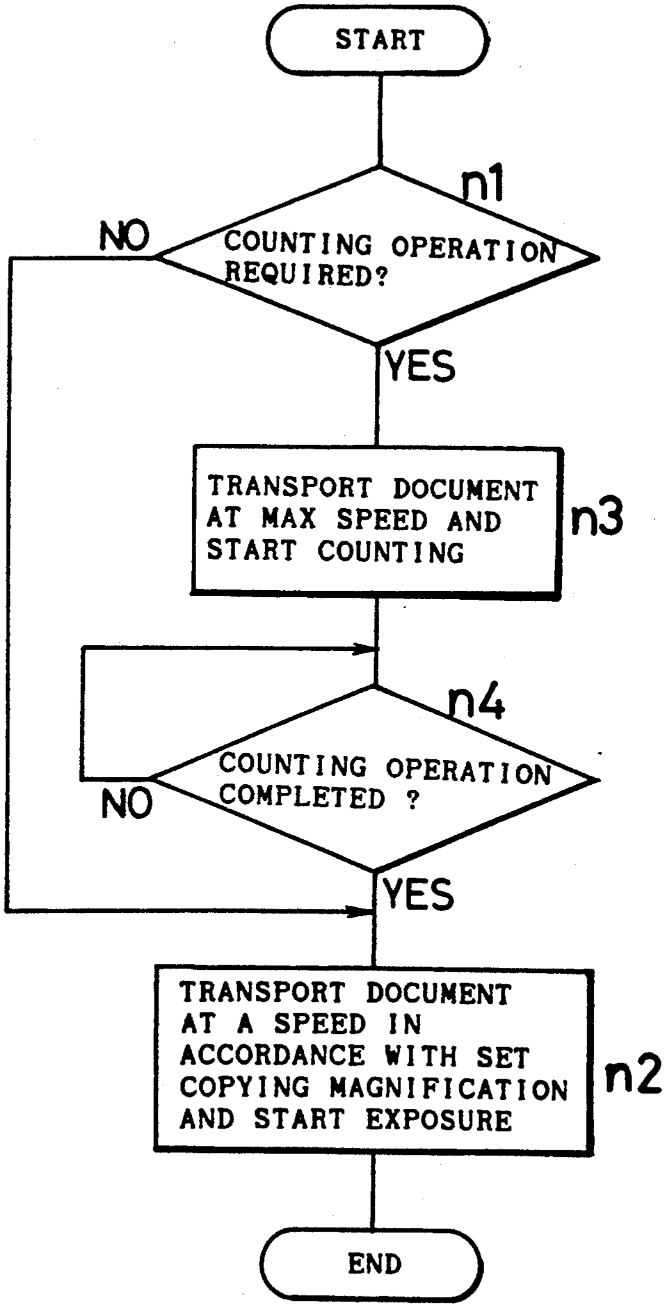
FIG. 3 is a flow chart describing counting operation of the present embodiment.

FIG. 3 is a flow chart describing the counting operation of the invention. A program shown in FIG. 3 is executed when various copying modes are selected through the use of the control panel provided on the main body 100 of the copying machine. At Step n1, it is determined whether a document counting mode is selected in response to the copying mode inputted through the use of the control panel. If the document counting mode is not selected, i.e. the (duplex→duplex) mode, (simplex→simplex) mode, or the like is selected, this routine proceeds to Step n2 in which the copying operation is effected by transporting the document D at a transporting speed in accordance with the set copying magnification to the reading stations 20, 21 to be exposed and read.

On the other hand, in the case where the document counting mode is selected at Step n1, i.e. the (simplex-duplex) mode, blank paper inserting mode, or the like is selected, the document counting mode is effected. Then, this routine proceeds to Step n3 in which the counting operation is started by transporting the documents D at maximum transporting speed higher than the transporting speed in accordance with the minimum copying magnification in the reduction mode. At Step n4, it is determined whether all the documents D placed in the placing member 2 have been circulated the transporting course thereof. In other words, it is determined whether the counting operation has been completed. Consequently, this routine proceeds to Step n2 in which the copying operation is effected by transporting the documents D to the reading stations 20, 21 to be exposed and read.

Since the documents D are transported at a high speed without being copied in the counting operation, the time required to effect the counting operation can be remarkably reduced.

Figure 4:
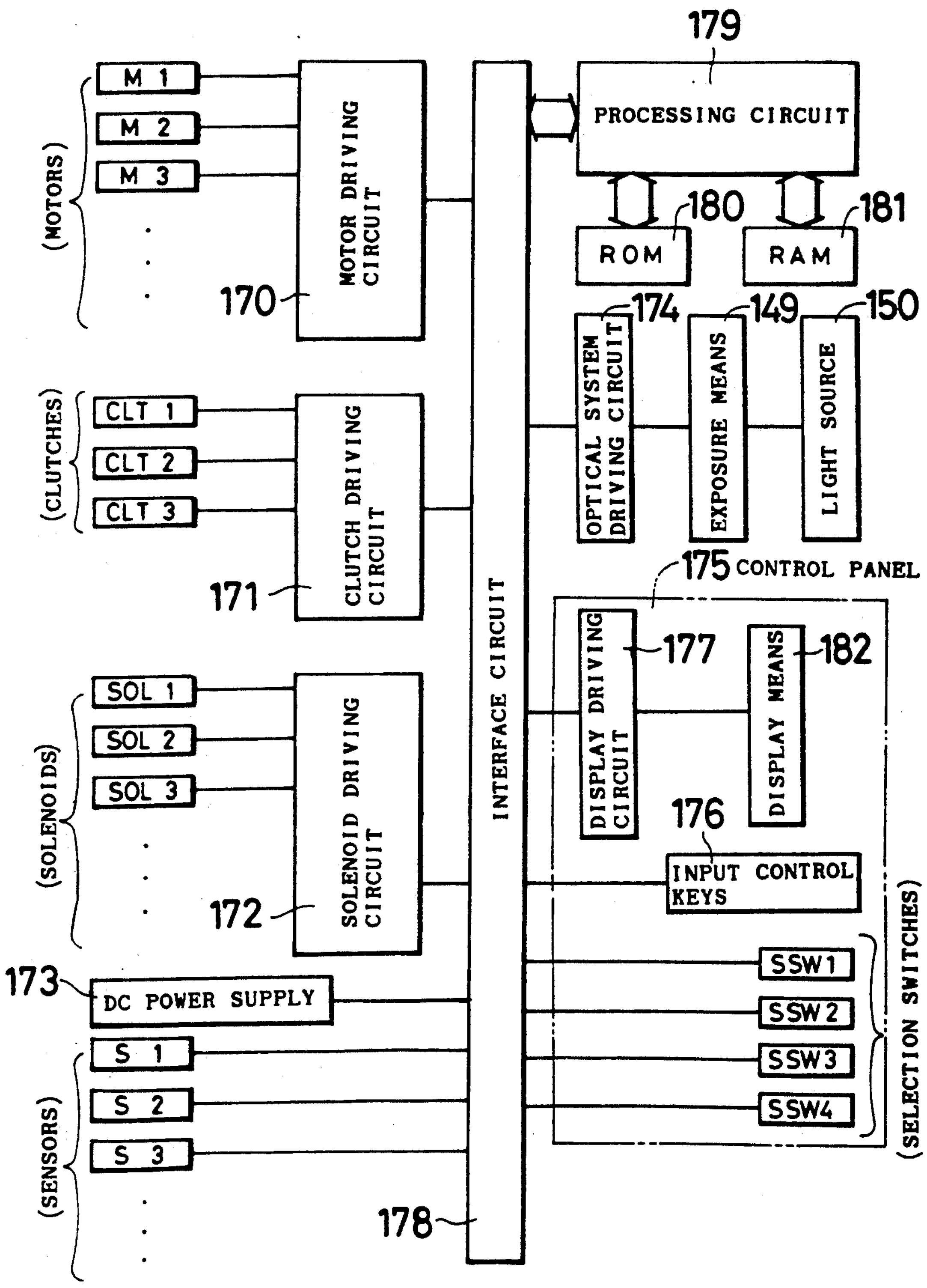
FIG. 4 is a block diagram showing a electric configuration of the copying apparatus.

FIG. 4 is a block diagram showing an electric construction of a controlling device for controlling the main body 100 of the copying machine and the document feeding apparatus 1. Motors M1, M2, M3, . . . for driving the transporting rollers and the support cylinders and the like are connected to a motor driving circuit 170. Clutches CLT1, CLT2, CLT3, . . . for synchronizing transport of the document D in the feeding apparatus 1 and transport of the recording paper P in the main body 100 of the copying machine with each other are connected to a clutch driving circuit 171. Solenoids SOL1, SOL2, . . . for actuating the direction switching claws 31, 35, . . . in the transporting paths are connected to a solenoid driving circuit 172.

These driving circuits 170 to 172 are connected to a interface circuit 178 along with a DC power source 173, sensors S1, S2, S3, . . . for detecting transporting state of the document D and the recording paper P, an optical system driving circuit 174, input control keys 176 on the control panel 175 disposed on the main body 100 of the copying machine, and a display driving circuit 177 for driving a display device on the control panel 175.

The interface circuit 178 is connected to a processing circuit 179 controllable by a microcomputer or the like, and adopted for sending sensor signals from the sensors to the processing circuit 179 and control signals from the processing circuit 179 to each of various driving circuits 170, 171, 172, 174, and 177. To the processing circuit 179 are connected a read only memory (ROM) 180 and a random access memory (RAM) 181. The processing circuit 179 controls the copying operation in accordance with a program for control prerecorded in the memory 180. The memory 181 serves as a calculation region for a counter, timer, and flag necessary for controlling the copying operation.

Further, the interface circuit 178 moves the exposure means 149 through the optical driving circuit 174 and controls on/off or lighting level of the light source 150 in the reading station 20, 21, and 105. Moreover, the interface circuit 178 sends a signal from the input control keys 176 on the control panel 175 to the processing circuit 179. The interface circuit 178 causes the display means 182 disposed on the control panel 175 to display the information representative of progress of the copying operation through the display driving circuit 177. With the use of a portion of the input control keys 176, the copying magnification can be set.

Furthermore, the interface circuit 178 has selection switches SSW1 to SSW4 for selecting the copying mode connected thereto as a part of the control panel 175. The selectable copying operation includes a (simplex→simplex) mode, (simplex→duplex) mode, (duplex→simplex) mode, and (duplex→duplex) mode.

The processing circuit 179 used as controlling means controls rotating speed of the motors M3 to M6 on the basis of the copying magnification set by input control keys 176 for driving the respective support cylinders 5, 6 and the respective transporting rollers for transporting the document D in the recirculating document feeding apparatus 1. The processing circuit 179 determines whether the counting operation is required based on the copying operation selected by the selection switches SSW1 to SSW4. In the case where the counting operation is required, the processing circuit 179 causes the motors M3 to M6 to drive at rotating speed in accordance with the maximum transporting speed, thereby reducing the time required for transporting the document D in the counting operation.

Since control of transporting speed of the document in the counting operation may rough compared with that in the copying operation, transportation of the document at high speed can be effected without providing a new speed controlling circuit.

Figure 5:
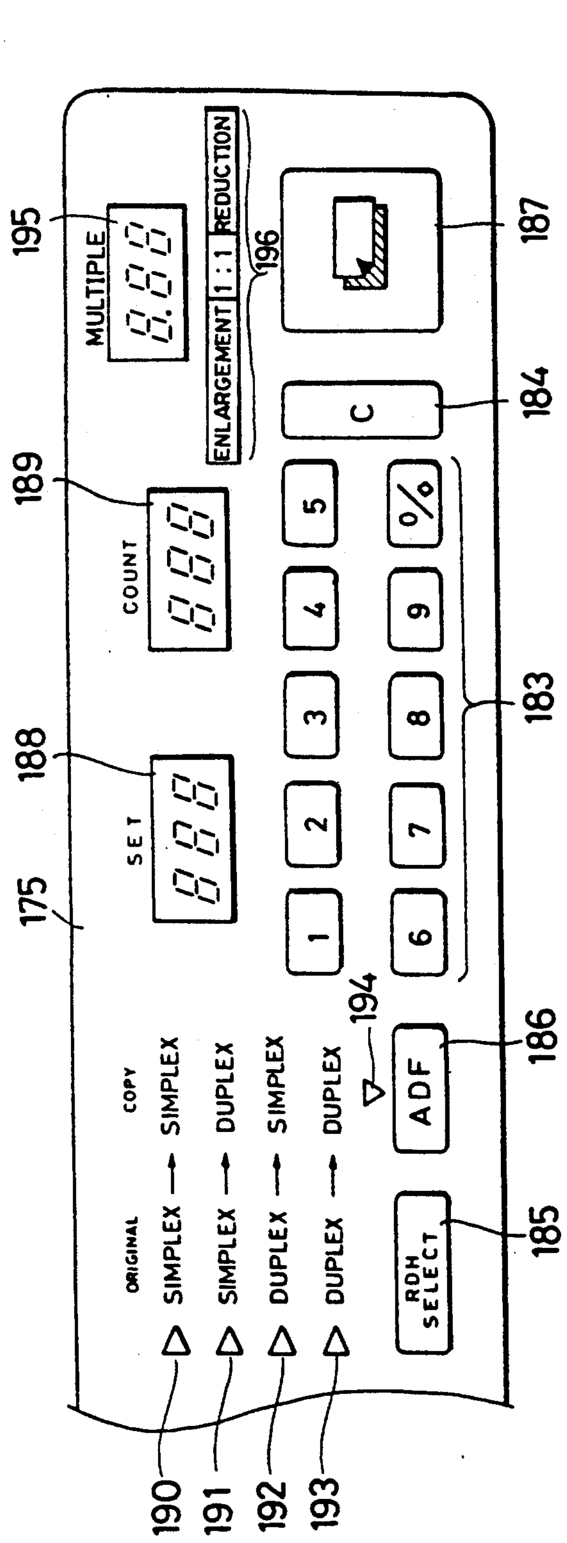
FIG. 5 is a partial plan view of a control panel 175.

FIG. 5 is a plan view showing one portion of a construction including the input control keys 176 and displaying means 182 on the control panel 175. The control panel 175 comprises numerical keys 183 for setting the number of the copies, a clear key 184, a mode selection key 185 for setting the copying mode, an ADF key 186 actuated in the case where the document is fixedly copied while being movingly scanned by the optical system, a print switch 187 for instructing a start of the copying operation, a display portion 188 for setting the number of copies, a display portion 189 for displaying the number of set of copies having been made, copying mode indicator 190 to 193 for the recirculating document feeding apparatus 1, an ADF indicator 194 for indicating that fixedly set documents are exposingly read while the optical system is driven to scan them, a copying magnification display portion 195, and a magnification setting key 196 for setting the copying magnification.

These copying mode indicators 190 to 193 indicates the (simplex→simplex) mode, (simplex→duplex) mode, (duplex→simplex) mode, (duplex→duplex) mode respectively. Each time the selection key 185 is pressed once, light emitting element is lighted on, for example, from the above to the below and the corresponding copying mode is selected. After the bottommost indicator, the uppermost indicator is lighted on. In an initial state, the uppermost indicator is lighted on, and thereafter the desired copying mode is selected. The number of set of copies are set by pressing the numerical key 183 and displayed in the display portion 188 by, for example a plurality of seven segment display devices.

The copying operation without the use of the feeding apparatus 1, i.e., in the case where, for example, a bound book is copied, the ADF indicator 194 is lighted on when the ADF key 186 is pressed, and such a copying mode is selected in which the exposure means 149 is driven to scan the document placed in the third reading station 105 so as to be exposed and read. The operator can set the desired copying magnification by selecting any one of the standard mode, enlargement mode, and reduction mode by means of the magnification setting key 196 in the desired copying mode. The set copying magnification is displayed on the copying magnification display portion 195.

When the print switch 187 is pressed, the copying operation is started and the number of sets having been copied is sequentially displayed in the display portion 189. When the number of sets of copies displayed in the display portion 189 agrees with that displayed in the display portion 188, the copying operation is stopped and the set number of copies automatically returns to "0". The number of copies remains to be displayed in the display portion 189, for example, until the print switch 187 is pressed next.

As described above, according to the invention, in the case where a counting operation is effected by transporting documents D without being copied in a recirculating document feeding apparatus 1 such as in a (simplex→duplex) mode, transporting speed of the documents D is set higher than transporting speed in accordance with the minimum copying magnification. Accordingly, the counting operation is effected at high speed regardless of the set copying magnification, thereby reducing the time required for the counting operation. More specifically, the time required for recording paper P to be discharged after the document D is placed in a document placing member 2 can be remarkably reduced, thereby improving operability of the copying machine.

In this embodiment, in the case where the document is transported without being copied, support cylinders 5, 6 and transporting rollers disposed only in the periphery of the support cylinders are controlled to be driven at maximum rotating speeds. However, it may be also appropriate that all the transporting rollers for transporting the document D disposed in the recirculating document feeding apparatus 1 be controlled to be driven at high rotating speeds in case of transportation of the document D without the copying operation.

Although this embodiment is described with reference to a transfer-type electrostatic copying machine, the invention is not limited to use in the transfer-type electrostatic copying machine. The invention may be embodied in a copying machine in which recording paper having a photosensitive surface on one side thereof is used, or other apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A copying machine for making duplex copies from a series of simplex documents, comprising:

means for selecting one of a plurality of copying modes including standard, reduction and enlargement;

means for setting a desired copying magnification;

a rotatable photoreceptor for receiving an image from a document at a first reading station;

a recirculating document feeding apparatus for transporting sheets of documents placed in containing means sequentially to the first reading station at a speed determined by the copying magnification set by said setting means and the copying mode selected by said selecting means and for returning the document to the containing means;

controlling means for performing a counting operation of said series of simplex documents beginning with a last one of said simplex documents, said controlling means performing said counting operation by operating said recirculating document feeding apparatus at a speed higher than a speed corresponding to the reduction mode with minimum magnification; and means for determining whether copying of the last one of said series to simplex documents should begin on a first side of a copy of a second side of the copy depending on whether the count obtained in said counting operation is odd or even;

wherein said recirculating document feeding apparatus comprises an endless transport belt mounted on a plurality of rollers beneath the containing means and having an upper portion stretched between two of said rollers, said upper portion serving as a placing member for returning documents to and supporting documents in said containing means;

wherein said copying machine may also be used for copying duplex documents, said copying machine further comprising a second reading station and a document inverting means for inverting documents between said first reading station and said second reading station.

2. The copying machine of claim 1 further comprising a first support cylinder positioned over said first reading station and a second support cylinder positioned above said second reading station, said first and second support cylinders being rotated in synchronization with the speed determined by the copying magnification set by said setting means and the copying mode selected by said selecting means when documents are being copied and being rotated at a maximum speed during the counting operation.

3. A document transporting apparatus comprising:

containing means for holding a stack of documents;

feed means for picking off an uppermost document from said stack of documents;

separating means for receiving the uppermost document from said feed means and for returning any additional documents stuck beneath the uppermost document to said containing means;

a first support cylinder positioned above a first reading station;

a transporting path for moving documents received from said separating means to said first support cylinder;

an endless transport belt mounted on a plurality of rollers beneath the containing means and having an upper portion stretched between two of said rollers, said upper portion serving as a placing member for returning documents to and supporting documents in said containing means;

means for transporting documents from said first support cylinder onto said endless transport belt; and controlling means for performing a counting operation of said stack of documents before performing a synchronized transport of documents to said first reading section, said controlling means performing said counting operation by operating said document transporting apparatus at a maximum speed higher than any speed for performing a synchronized transport of documents to said first reading station;

wherein said means for transporting documents comprises a second support cylinder and means for inverting documents received from said first support cylinder and for providing inverted documents to said second support cylinder.

* * * * *